(12) United States Patent
Baxter, Jr.

(10) Patent No.: US 9,040,645 B2
(45) Date of Patent: May 26, 2015

(54) CATALYST SYSTEM FOR HETEROGENOUS CATALYSIS OF AN ISOBUTYLENE POLYMERIZATION REACTION

(71) Applicant: C. Edward Baxter, Jr., League City, TX (US)

(72) Inventor: C. Edward Baxter, Jr., League City, TX (US)

(73) Assignee: PETROCHEMICAL SUPPLY, INC., Houston, TX (US)

( * ) Notice: Subject to any disclaimer, the term of this patent is extended or adjusted under 35 U.S.C. 154(b) by 0 days.

(21) Appl. No.: 14/262,263

(22) Filed: Apr. 25, 2014

(65) Prior Publication Data

US 2014/0296460 A1    Oct. 2, 2014

Related U.S. Application Data

(63) Continuation-in-part of application No. 13/500,956, filed as application No. PCT/US2011/027769 on Mar. 9, 2011, now Pat. No. 8,791,216.

(60) Provisional application No. 61/312,869, filed on Mar. 11, 2010.

(51) Int. Cl.

| C08F 2/00 | (2006.01) |
|---|---|
| B01J 31/00 | (2006.01) |
| C07C 2/00 | (2006.01) |
| C08F 110/10 | (2006.01) |

(52) U.S. Cl.
CPC ................................ C08F 110/10 (2013.01)

(58) Field of Classification Search
CPC ... C08F 110/10; B01J 35/1019; B01J 27/198; B01J 31/0201
USPC ............................ 526/212; 502/172; 585/500
See application file for complete search history.

(56) References Cited

U.S. PATENT DOCUMENTS

| 2,484,384 A | 10/1949 | Levine et al. |
|---|---|---|
| 2,677,002 A | 4/1954 | Yahnke et al. |
| 2,918,255 A | 3/1957 | McGinnis |
| 2,804,411 A | 8/1957 | Anderson et al. |
| 2,957,930 A | 10/1960 | Jackson |
| 2,976,338 A | 3/1961 | Thomas et al. |
| 3,114,785 A | 12/1963 | Hervert et al. |
| 3,119,884 A | 1/1964 | Allen et al. |
| 4,152,499 A | 5/1979 | Boerzel et al. |
| 4,306,105 A | 12/1981 | Abernathy et al. |
| 4,407,731 A | 10/1983 | Imai |
| 4,427,791 A | 1/1984 | Miale et al. |
| 4,605,808 A | 8/1986 | Samson |
| 4,935,577 A | 6/1990 | Huss et al. |
| 5,191,044 A | 3/1993 | Rath et al. |
| 5,408,018 A | 4/1995 | Rath |
| 5,710,225 A | 1/1998 | Johnson et al. |

(Continued)

*Primary Examiner* — William Cheung
(74) *Attorney, Agent, or Firm* — Egbert Law Offices, PLLC

(57) ABSTRACT

A method for preparing a catalyst system for heterogenous catalysis of an isobutylene polymerization reaction includes the steps of forming an alumina support in which the alumina support has pores formed therein, and reacting $BF_3$/methanol catalyst complex with the alumina support. The ratio of methanol to $BF_3$ in the catalyst complex ranges from 0.5 moles to 2 moles of methanol per mole of $BF_3$. The alumina support is formed so as to have pores each having a diameter of greater than twenty nanometers. The alumina support can be in the form of beads or extrudates having a length significantly greater than a diameter. The extrudate can also have a tri-lobe configuration.

18 Claims, 2 Drawing Sheets

(56) References Cited

U.S. PATENT DOCUMENTS

| | | |
|---|---|---|
| 5,770,539 A | 6/1998 | Chen et al. |
| 5,874,380 A | 2/1999 | Chen et al. |
| 6,384,154 B1 | 5/2002 | Sigwart et al. |
| 6,479,598 B1 * | 11/2002 | Lewtas et al. .................. 526/69 |
| 6,525,149 B1 | 2/2003 | Baxter et al. |
| 6,562,913 B1 | 5/2003 | Baxter et al. |
| 6,683,138 B2 | 1/2004 | Baxter et al. |
| 6,710,140 B2 | 3/2004 | Wettling et al. |
| 6,884,858 B2 | 4/2005 | Baxter et al. |
| 6,992,152 B2 | 1/2006 | Baxter et al. |
| 7,411,104 B2 | 8/2008 | Yum et al. |
| 8,791,216 B2 * | 7/2014 | Baxter, Jr. ...................... 526/69 |
| 2009/0023882 A1 * | 1/2009 | Hanefeld et al. ........... 526/348.7 |

* cited by examiner

CATALYST SYSTEM FOR HETEROGENOUS CATALYSIS OF AN ISOBUTYLENE POLYMERIZATION REACTION

CROSS-REFERENCE TO RELATED APPLICATIONS

The present application is a Continuation-in-Part of U.S. patent application Ser. No. 13/500,956, filed on May 22, 2012, and entitled "Activated Inorganic Metal Oxides", now U.S. Pat. No. 8,791,216, which is the National Stage Entry of PCT/US2011/027769, filed on Mar. 9, 2011, and entitled "Activated Inorganic Metal Oxides". PCT/US2011/027769 claimed priority from U.S. Provisional Patent Application No. 61/312,869, filed on Mar. 11, 2010, and entitled "Activated Inorganic Metal Oxides".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to catalyst used in isobutylene polymerization reactions. More particularly, the present invention relates to an alumina support for such catalyst system in which the alumina support has pores formed therein.

2. Description of Related Art Including Information Disclosed Under 37 CFR 1.97 and 37 CFR 1.98.

A great number of different types of catalyst systems have been proposed in the past for conducting organic compound conversion reactions. These systems include the use of such things as (1) Metal Oxide $BF_3$ Complexes, (2) $BF_3$ and Liquid $BF_3$ Complexes as Catalysts for Isobutylene Polymerization, (3) Liquid $BF_3$ Methanol Complexes as Isobutylene Polymerization Catalysts, and (4) Solid Isobutylene Polymerization Catalysts. Prior art relevant to these prior art systems is discussed below.

Metal Oxide $BF_3$ Complexes

Inorganic metal oxides, such as alumina, have been provided with catalytic activity in the past by contacting the same with $BF_3$, usually in gaseous form. The contacting is usually followed by hydrolysis and calcination or some other post-treatment. These catalysts generally have limited activity, are not stable and release free $BF_3$ into the reaction products requiring post reaction removal of these residues.

U.S. Pat. No. 2,804,411, assigned to American Oil Company, discloses treatment of a Is stabilized gelled alumina with gaseous $BF_3$. Free $BF_3$ is required to be added to the reaction mixture.

U.S. Pat. No. 2,976,338, assigned to Esso, describes an olefin polymerization catalyst comprising a $BF_3$—$H_3PO_4$ complex that may be absorbed onto a solid support.

U.S. Pat. No. 3,114,785, assigned to UOP, describes an olefin isomerization catalyst made by contacting anhydrous gamma or theta alumina with gaseous $BF_3$ at temperatures from about 100° C. to 150° C. for 10 hours or until alumina is saturated. The process of olefin isomerization using the $BF_3$-alumina catalyst is claimed; the composition of the catalyst is not claimed.

U.S. Pat. No. 4,407,731, assigned to UOP, claims catalytic compositions of matter prepared by pre-treating a metal oxide, such as alumina, with aqueous acid and base followed by calcination. The treated gamma alumina is then treated with $BF_3$ gas at temperatures of 308-348° C. at elevated pressure to obtain the final catalyst useful for oligomerization and alkylation reactions.

U.S. Pat. No. 4,427,791, assigned to Mobil Oil Co., discloses a method for enhancing the activity of metal oxides, such as alumina, by treating the alumina with $NH_4F$ or $BF_3$, contacting this fluoride containing product with an ammonium exchange solution and then calcinating the final product.

U.S. Pat. No. 4,918,255, assigned to Mobil Oil Co., describes an isoparaffin alkylation catalyst based on metal oxides and aluminosilicate zeolites treated with a Lewis acid, including $BF_3$, in the presence of a controlled amount of water or water-producing material. Excess $BF_3$, to that needed to saturate the metal oxide, is used requiring post reaction $BF_3$ removal.

U.S. Pat. No. 4,935,577, assigned to Mobil Oil Co., describes a catalytic distillation process using a non-zeolite metal oxide activated with $BF_3$ gas. Excess $BF_3$, above that needed to saturate the metal oxide is used requiring post reaction $BF_3$ removal.

$BF_3$ and Liquid $BF_3$ Complexes as Catalysts for Isobutylene Polymerization

The homogenous catalytic polymerization of olefins using gaseous $BF_3$ and liquid $BF_3$ complexes is well known. The polymers generally so produced are of the highly reactive type wherein a large percentage of the polymer contains terminal double bonds or has a high vinylidene content. All of these processes require post-reaction removal of the $BF_3$ catalyst.

U.S. Pat. No. 4,152,499, issued to Boerzel et al., describes the synthesis of polyisobutylene having a degree of polymerization of 10-100 units using a blanket of $BF_3$ gas as the catalyst. The polyisobutylene product was then reacted with maleic anhydride in yields of 60-90% indicating a large portion of vinylidene end groups.

U.S. Pat. No. 4,605,808, issued to Samson, describes production of a polyisobutylene having at least 70% unsaturation in the terminal position. An alcohol complex of $BF_3$ was used as the catalyst. Complexing the $BF_3$ seems to give better control of the reaction and higher vinylidene content.

U.S. Pat. No. 7,411,104, assigned to Daelim Industrial Co., describes a method for producing highly reactive polyisobutylene from a raffinate-1 stream using a liquid $BF_3$ secondary alkyl ether-tertiary alcohol complex. The process requires low reaction temperatures and the catalyst complex is not stable and must be made in situ. The catalyst must be removed from the reactor effluent by a post reaction treatment process.

U.S. Pat. No. 5,191,044, issued to Rath et al., discloses a process for preparing polyisobutylene in which the $BF_3$ catalyst is completely complexed with an alcohol such that there is no free $BF_3$ in the reactor or in the reaction zones. An excess of alcohol complexing agent is required to assure that no free $BF_3$ is present. The reaction times are on the order of 10 minutes with reaction temperatures of below 0° C.

Rath, in U.S. Pat. No. 5,408,018 describes a multistage process for preparing highly reactive polyisobutene with a content of terminal vinylidene groups of more than 80 mol % and an average molecular weight of 500-5000 Dalton by the cationic polymerization of isobutene or isobutene-containing hydrocarbon feeds in liquid phase with the aid of boron trifluoride as catalyst and at from 0° C. to −60° C. comprises polymerizing in the presence of secondary alcohols with 3-20 carbon atoms and/or ethers with 2-20 carbon atoms.

Olefin polymerization, especially isobutylene polymerization, is an exothermic process. Control of reaction temperature is critical to product quality, catalyst life, degree of polymerization and obtaining the desired pre-selected properties. In the patents cited above, the reaction temperature was controlled by dilute olefin monomer concentration, complexed catalyst, multi-stage reactions and/or long reaction times and low reaction temperatures. Low reaction temperatures increase energy requirements; long reaction times or dilute feed streams increase equipment size and equipment cost (capital expenditures).

Liquid $BF_3$ Methanol Complexes as Isobutylene Polymerization Catalysts

U.S. Pat. Nos. 6,525,149, 6,562,913, 6,683,138, 6,884,858 and 6,992,152, to Baxter, et al. al, describe an olefin polymerization process in which the polymerization is carried out in the tube side of a heat exchanger under turbulent flow conditions. The reactor design allows for very effective and efficient removal of the heat of reaction such that relatively high feed rates and concentrated feed streams may be used. $BF_3$-methanol complex is used as the catalyst and because this complex is particularly stable, higher reaction temperatures may be used. The $BF_3$-methanol catalyst complex may be preformed, formed in-situ by separate injection of the methanol complexing agent, or a combination of both.

The $BF_3$ methanol complexes are very stable allowing for higher isobutylene polymerization temperatures not possible with other $BF_3$ oxygenate complexes, particularly higher alcohols, secondary alcohols, ethers and the like. Also, because higher reaction temperatures may be used, reaction rates are increased.

However, in all of the patents cited above, the $BF_3$, or at least portions of the $BF_3$, catalyst are soluble in the polymer products. Residual $BF_3$ is detrimental to product quality and must be removed as quickly as possible. Hence, these processes must employ some kind of catalyst quench and catalyst removal steps subsequent to the reaction. The quenched $BF_3$ streams cannot be recycled and the $BF_3$ is lost.

Solid Isobutylene Polymerization Catalysts

Isobutylene and butylene polymerizations have also been conducted using solid catalysts, particularly Friedel-Crafts type catalysts such as $AlCl_3$. The advantage to these processes is that the catalyst is a solid and is not soluble in the product. Catalyst removal and product purification is much easier than in the $BF_3$ catalyzed reactions U.S. Pat. No. 2,484,384, assigned to California Research Corporation, U.S. Pat. No. 2,677,002, assigned to Standard Oil Co., U.S. Pat. No. 2,957,930, assigned to Cosden Petroleum Corporation and U.S. Pat. No. 3,119,884, assigned to Cosden Petroleum Corporation, all describe $AlCl_3$ catalyzed butylene polymerization processes using a fluidized bed reactor system.

U.S. Pat. No. 4,306,105, assigned to Cosden Petroleum Corporation, describes a chlorinated alumina catalyst prepared by reacting pure alumina with pure chlorine. A fluidized bed reactor is utilized for butene polymerization.

Solid catalysts have also been used to produce olefin polymers with a high proportion of terminal vinylidene groups.

U.S. Pat. No. 5,710,225, assigned to Lubrizol, claims the use of phosphotungstic acid salt to polymerize $C_2$-$C_{30}$ olefins to produce polymers with molecular weights in the range of 300-20,000. The use of phosphotungstic catalyst, in a fixed bed reactor, is also described, but the flow rate is low and is generally operated as a plug flow reactor. The resulting polymer has an undesirable very high polydispersity. The fixed bed reactor as described in the example would not be economically feasible.

U.S. Pat. No. 5,770,539, assigned to Exxon Chemical Patents, Inc., discloses heterogeneous Lewis acids polymerization catalysts, such as $BF_3$, immobilized in porous polymer substrates. The $BF_3$ is complexed with the aromatic rings of cross-linked polystyrene copolymers.

U.S. Pat. No. 5,874,380, assigned to Exxon Chemical Patents, Inc., claims a solid state insoluble salt catalyst system for the carbocationic polymerization of olefin monomer in the presence of polar or non-polar reaction medium which comprises at least one salt of a strong acid and a carbocationically active transition metal catalyst selected from Groups IIIA, IVA, VA, and VIA of the Periodic Table of the Elements.

U.S. Pat. No. 6,384,154, assigned to BASF Aktiengesellshaft, discloses a process for preparing halogen free, reactive polyisobutylene by cationic polymerization over an acidic, halogen free heterogeneous catalyst comprising oxides and elements from transition or main group I, II, III, IV, V, VI, VII or VIII of the Periodic Table of the Elements. The polymerization is carried out in a fixed bed reactor.

The solid, heterogeneous butylene polymerization catalysts cited above do solve the problem of catalyst residues in the reactor effluent, thereby eliminating the need for post reaction treatment. However, conversions are low, space velocities are low and reaction temperatures are low.

$BF_3$ activated metal oxides are not described in the prior art as polymerization catalysts for the manufacture of polybutene or polyisobutylene. In fact, U.S. Pat. No. 6,710,140 assigned to BASF Aktiengesellshaft, claims the use of alumina as a solid deactivator to absorb $BF_3$ catalyst residues from polyisobutylene reactor effluents. The resulting $BF_3$-alumina complex is described to be not catalytic.

U.S. application Ser. No. 13/50,956 describes a catalyst system for the heterogenous catalysis of organic compound conversion reactions. The system includes a reaction product of a $BF_3$/alcohol catalyst complex and an activated metal oxide support for the catalyst complex. In particular, the activated metal oxide support is an alumina support. In experiments conducted with the process identified in this application, it was found that the alumina support utilized alumina beads within a fixed bed. In general, these alumina beads had a relatively short catalyst life. The use of such solid beads were somewhat difficult control. These beads produced a lower molecular weight because of a drop-off in conversion rates. As such, is necessary to adjust temperatures in order to control the reaction process. Ultimately, only a surface reaction occurred on these alumina beads. Ultimately, lower conversions occurred and a higher molecular weight product resulted. As such, there was a need to modify the alumina support so as to enhance the process.

It is an object of the present invention to provide a catalysis process which enhances the diffusion of the catalyst complex on the alumina support.

It is another object the present invention to provide a catalysis process which facilitates the flow of long chain polymers.

It is another object of the present invention to provide a catalysis process which enhances the life of the catalyst.

It is another object the present invention to provide a catalysis process which makes it easier to control the reaction.

It is still further object of the present invention to provide a catalysis process which produces a product being a higher molecular weight with lower temperatures.

These and other objects and advantages of the present invention will become apparent from a reading of the attached specification and appended claims.

BRIEF SUMMARY OF THE INVENTION

The present invention is a method for preparing a catalyst system for heterogenous catalysis of an isobutylene polymerization reaction including the steps of: (1) forming an alumina support in which the alumina support has pores formed therein; and (2) reacting $BF_3$/methanol catalyst complex with the alumina support. The ratio of methanol to $BF_3$ in the catalyst complex ranges from 0.5 moles of methanol per mole of $BF_3$ to 2 moles of methanol per mole of $BF_3$. A concentration of the catalyst complex on the alumina support will range between 10% and 40% by weight.

In the method of the present invention, the step of forming includes forming the alumina support so as to have pores each having a diameter greater than 20 nanometers. This step of forming includes forming the alumina support into a bead form. Alternatively, the step of forming includes extruding the alumina support so as to have a significantly greater length dimension than a diameter dimension. The extruded alumina support can have a tri-lobe configuration in a cross section transverse to the length dimension. This extruded alumina support can also have a cylindrical configuration. The alumina support is formed of amorphous alumina. The alumina support includes a plurality of alumina elements that are placed within a fixed bed. The step of reacting occurs in the fixed bed.

The step of reacting includes a reaction selected from the group consisting of Friedel-Crafts alkylantion, phenol alkylation, olefin dimerization, olefin oligomerization, olefin polymerization, propylene oligomerization, propylene polymerization, butylene dimerization, butylene oligomerization, isobutylene dimerization, isobutylene oligomerization, butylene polymerization, isobutylene polymerization and isoparaffin alkylation. The concentration of the catalyst complex on the alumina support will range between 30% and 40% by weight. Isobutylene is formed as a result of the step of reacting. The process can further include polymerizing the isobutylene so as to form a polyisobutylene product.

In the process of the present invention, the alumina support is formed substantially entirely of alumina.

The present invention provides a process for preparing an improved catalyst system that can be used in connection with a $BF_3$/methanol-alumina reaction product having increased activity over catalyst compositions obtained using other processes and methods. The $BF_3$/methanol-alumina reaction products of the present invention are stable at operating conditions and the organic conversion products made using these catalyst systems do not contain catalyst residues and are free from boron and fluorine residues. Because the conversion products do not contain catalyst residues, post-reaction catalyst removal is not required. Thus, the heterogenous production processes are greatly simplified through the use of the catalyst system of the present invention.

The catalyst system of the present invention is particularly applicable to the heterogenous catalytic polymerization of isobutylene in isobutylene-containing streams to thereby produce polyisobutylenes, and even more particularly, highly reactive polyisobutylenes. The catalyst systems of the present invention are particularly well suited for use in connection with the conduct of acid-catalyzed reactions, such as dimerization and an oligonerazation of olefins.

The catalyst systems of the present invention are highly stable and are generally not consumed during the reaction. That is to say, the catalyst systems of the present invention do not require regenerization. Moreover, when the catalyst systems of the present invention are used in the form of a fixed bed, there is generally no need for further treatment of the product for removal of catalyst residues.

The use of the pores having a relatively large pore diameter associated with the alumina support of the present invention facilitates the reaction process. In particular, the use of relatively large pores having a diameter greater than 20 nanometers avoids the blocking of the pores by the long chain polymers. These long chain polymers can flow into and through the pores without blockage. As a result, there is better diffusion of the $BF_3$/methanol catalyst complex within the alumina support. This results in a longer catalyst life, an easier to control reaction, along with higher molecular weights at lower temperatures.

The foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
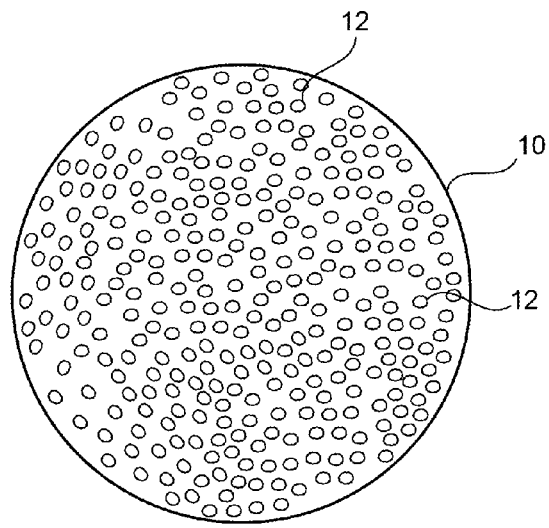
FIG. 1 is a side elevational view of a single alumina element in the form of a bead.

The present invention serves to provide an efficient, heterogenous catalyst system for the polymerization of isobutylene in order to produce highly reactive polyisobutylene. The activated metal oxide catalysts of the present invention are prepared by reacting normally liquid $BF_3$/methanol complexes with amorphous crystalline aluminum oxide (alumina).

The $BF_3$-alumina compositions of the prior art are not catalytic for some organic conversion reactions, as reported in U.S. Pat. No. 6,710,140. Moreover, in some cases at $BF_3$ levels that might be catalytic, the $BF_3$ leeches off and requires additional $BF_3$ to be added, along with the reactant feed. This, of course, defeats the purpose of a solid heterogenous catalyst since post treatment of the reactor effluent is required to remove the $BF_3$ residues.

In accordance with the present invention, it is been unexpectedly found that if normally liquid $BF_3$-methanol complexes are used instead of $BF_3$ gas, the resulting reaction products with crystalline alumina are highly catalytic, are stable, have a long life, and are not deactivated or consumed during the catalytic process. Moreover, high loadings of $BF_3$ may be achieved without the problem of $BF_3$ leaching into the reaction mixture. The preferred form of alumina is amorphous alumina. The alumina support of the present invention should be formed substantially entirely of alumina. The alumina must be essentially dry before reacting with the BF$_3$/alcohol complex. This may be accomplished by heating the alumina at 200° C. for 10 hours to 20 hours.

The BF$_3$/methanol complex may be formed by passing BF$_3$ gas through a solution of anhydrous alcohol at a rate that allows the BF$_3$ to be efficiently absorbed. The ratio of alcohol to the BF$_3$ may generally range from about 0.5 moles of alcohol per mole of BF$_3$ to about 2 moles of alcohol per mole of BF$_3$. A more preferred range is from about 1 mole of methanol per mole of BF$_3$ to about 2 moles of methanol per mole of BF$_3$. The preferred range, which is been tested and has been found most effective, is from about 1 mole of the methanol per mole of BF$_3$ to about 1.3 moles of methanol per mole of BF$_3$.

Alcohols in the range of $C_3$-$C_{10}$, with no alpha hydrogens, are suitable for complexing with BF$_3$. Alcohols that have a hydrogens that are easily dehydrated by BF$_3$ to form olefins. Even if BF$_3$/alcohol complexes are formed at low temperatures, for example, the resulting complexes are not stable at reaction temperatures. The most preferred alcohol is methanol.

The reaction of the BF$_3$/methanol complex with alumina is highly exothermic and must be controlled to avoid loss of BF$_3$. The BF$_3$/methanol may be added by any mechanical means that allows good mixing of the complex with the alumina and also allows for adequate temperature control. A preferred method is to add the alumina to a rotating double cone mixer and meter in the BF$_3$/methanol complex such that the temperature is controlled within the desired range. The temperature during the mixing should not exceed 50-60° C.

The concentration of the BF$_3$/alcohol complex on the alumina has been found to range between 10% to about 40% by weight. The preferred range, which has been proven most successful through tests of the present process, is between 30% to 40% by weight.

The final catalyst composition which is a BF$_3$/methanol-alumina reaction product may be used to catalyze organic compound conversion reactions. The catalyst composition may be conducted with the reactants in a batch or a continuous process.

Importantly, experiments conducted with the process of prior U.S. application Ser. No. 13/500,956 have indicated that certain improvements to the process are desired. The use of solid alumina beads as part of the alumina support, while effective in the prior method, has been found to produce only reactions on the surfaces of the beads. As a result, there are lower conversion rates and higher molecular weights than desired. It is a more difficult process to control. A drop off in conversions can occur. As such, there is a need to adjust temperature continuously in order to provide the desired conversion rates.

The use of pores in association with the alumina support was originally believed to be undesirable. The use of such pores would create less mechanical stability of the alumina support. As such, there was concern that the catalyst could collapse over time with large pores incorporated into the alumina support.

Experiments were conducted in which the alumina support was in the form of beads having relatively small pores of less than 10 nanometers in diameter. After a period of time, it was found that such small diameter pores in the beads would be blocked by the long chain polymers in the reaction process. As such, such small diameter pores incorporated into such beads were found to be less effective than the solid beads. Ultimately, such small diameter pores in bead structures would provide less mechanical stability and ultimately not improve the surface area of the reaction between the BF$_3$/methanol complex and the alumina. As a result, experiments conducted with the structure of the alumina support found that the alumina elements of the alumina support would work more effectively if the pores were of a significantly large diameter, i.e. in excess of 20 nanometers in diameter.

Referring to FIG. 1, there is shown a bead 10 in accordance with the present invention. The bead 10 has pores 12 formed therein. The bead 10 is formed substantially entirely of alumina. Each of the pores 12 will have a diameter of greater than 20 nanometers. Typically, the bead 10 is one of a large number of beads that are placed into a fixed bed reactor. As such, the reaction process will occur between the BF$_3$/methanol and the alumina of the bead 10. In experiments conducted with the bead 10 of FIG. 1, it has been shown that when the pores have a diameter of 20 nanometers or greater, the long chain polymers will pass into and through the pores. Ultimately, the pores having a diameter greater than twenty nanometers will not block the passage of the long chain polymers. Typically, the bead 10 will have a diameter 1/16 inch. However, is believed that beads having a diameter of 3/16 inch or greater can be useful in the process of the present invention. Ultimately, the bead 10 having such large diameter pores has been found to enhance the process of the present invention. In particular, there is greater diffusion across the surface of the alumina bead 10 and through the pores 12. This leads to a longer catalyst life. The reaction that occurs as a result of the bead 10 is easier to control. As a result, the reaction product will have higher molecular weights at lower temperatures.

Figure 2:
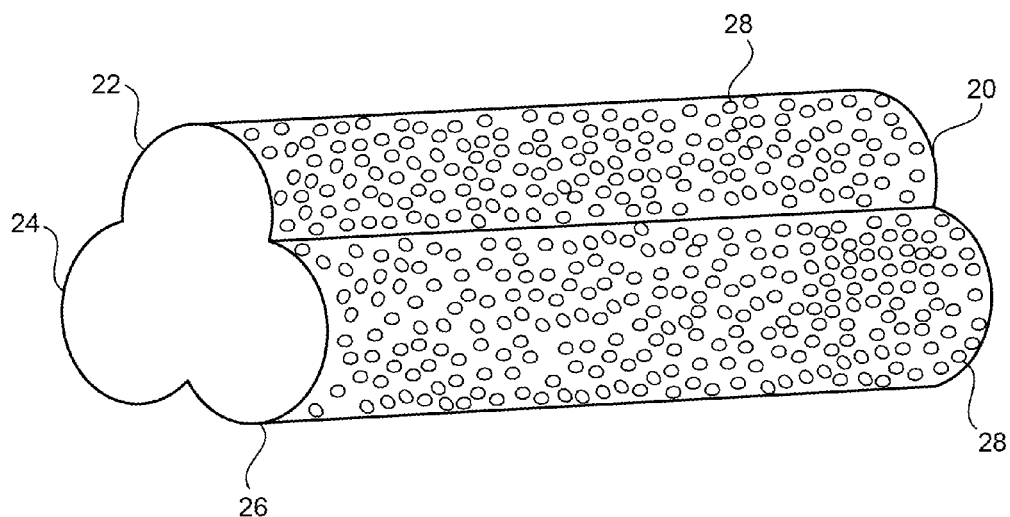
FIG. 2 is a perspective view showing the single alumina element in the form of a tri-lobe extrudate.

FIG. 2 is a preferred form of the alumina element 20 in accordance with the present invention. As can be seen, the alumina element 20 is an extrudate. The alumina element 20 will be of a tri-lobe configuration. In other words, the tri-lobes will occur in a cross section of the alumina element 20 transverse to the longitudinal dimension of the alumina element 20. The alumina element 20, being an extrudate, will have a length dimension significantly greater than the diameter dimension. The alumina element 20 includes three lobes 22, 24 and 26. The alumina element 20 has a plurality of pores 28 formed into and through the lobes 22, 24 and 26. This tri-lobe configuration enhances the diffusion rate of the BF$_3$/methanol through the pores 28. In other words, there is a shorter distance between the inlet and outlet of the pore as a result of this tri-lobe configuration. This configuration of the alumina element 20 has proven to have better diffusion rates, a longer catalyst life and an easier to control reaction than the bead 10 of FIG. 1. Importantly, since each of the pores 28 has a diameter greater than twenty nanometers, they will not block the flow of long chain polymers through the alumina element 20. As such, the surface area of the alumina element 20 that is exposed to the BF$_3$/methanol is greater than the formation of the alumina element 20 without the pores 28.

Figure 3:
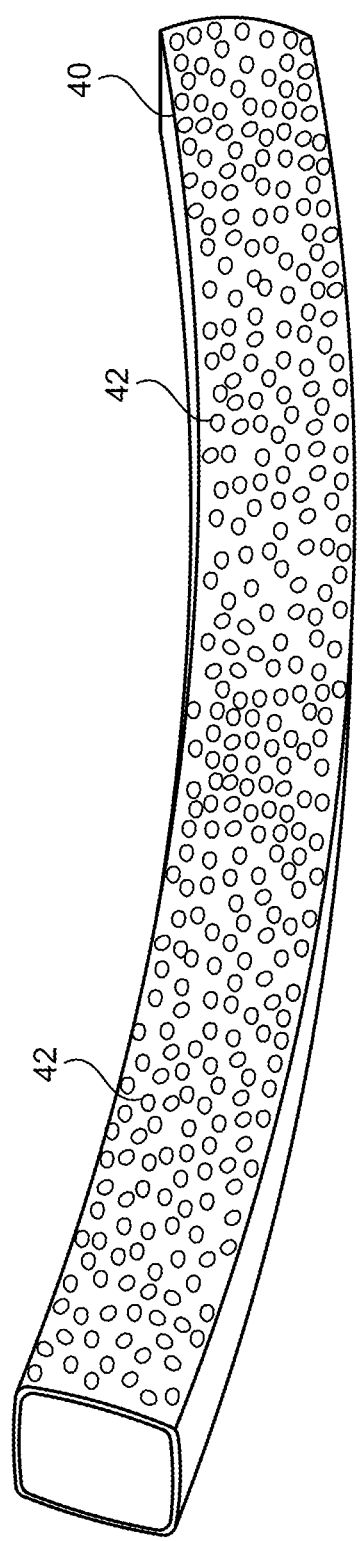
FIG. 3 is a perspective view showing the single alumina element in the form of a cylindrical extrudate.

FIG. 3 is another embodiment of the alumina element 40 in accordance with the present invention. It can be seen that the alumina element 40 has an elongate structure of a generally cylindrical shape. The pores 42 are formed along the alumina element 40. The alumina element 40 is also an extrudate. Importantly, it should be noted that the length of the alumina element 40 can be virtually unlimited. The length of the alumina element 40 should only be limited by the mechanical properties and its ability to be incorporated within the fixed bed reactor. As such, if the alumina element 40 had an extremely long length, in the order of several feet, then it would still work effectively in the process of the present invention and, perhaps more effectively. Ultimately, the alumina element 40 will have a length dimension significantly greater than the diameter of the cylindrically-shaped alumina element 40. Once again, the alumina element 40 is formed substantially entirely of alumina. The use of the pores 42 on the alumina element 40 also minimizes the distance for the polymer to flow through the pores. Each of the pores 42 will extend transverse to the longitudinal axis of the alumina element 40.

The incorporation of the pores in the each of the embodiments of FIGS. 1-3 would be contrary to conventional thinking associated with the formation of alumina elements within a fixed bed reactor. The incorporation of pores would initially cause one to believe that the alumina elements will have less mechanical stability than alumina elements without the pores. However, experiments conducted with each of these embodiments has shown that, although mechanical stability is less, there is significantly improved diffusion, life, controllability, and molecular weights associated with such an alumina element.

In a preferred embodiment of the invention, the reactor may be a shell in tube heat exchanger in which the catalyst composition is packed in the tubes. Such an arrangement may be referred to as a fixed bed reactor. This is especially suitable for highly exothermic reactions such as olefin polymerization, particularly isobutylene polymerization.

The exchanger may be situated vertically. The heat exchange media may be circulated through the shell side of the exchanger. The exchanger may be either a single or multiple pass type. A two pass exchanger is particularly desirable. The exchanger may be fitted with a recirculation loop to accommodate a volumetric recirculation flow. The olefin-containing feed stock may enter the reactor via a recirculation pump at a location downstream from the pump. The recirculation pump pushes the olefin stream through the reactor tubes and returns the stream to the suction side of the pump. In the case of the two-pass heat exchanger, the recirculation flow may enter through the bottom of the reactor, then pass through the tubes, exit the reactor from the bottom and return to the pump. This flow scheme constitutes what is generally considered a loop reactor. The pump speed, or an internal recirculation loop on the pump itself, is used to control the flow rate. The flow rate preferably may be sufficient to generate a velocity that causes turbulent, or at least non-laminar flow of the olefin feed stream over the fixed bed catalyst composition packed in the tubes.

A volumetric feedstock flow may enter the recirculation loop via a feed pump at a location between the outlet of the recirculation pump and the bottom of the reactor at the beginning of the first pass. At equilibrium, the concentrations of the olefin monomer and the polymer products is constant throughout the reactor so the point at which the reaction effluent leaves the reactor is a matter of choice. However, it may be convenient for the effluent line to be located at the top of the reactor after the first pass. The effluent flow rate is necessarily equal to the volumetric feedstock flow rate. The volumetric feedstock flow rate is independent of the volumetric recirculation flow rate and desirably may be adjusted so as to achieve a desired residence time and conversion.

The reactor may be fitted with appropriate temperature, pressure and flow indicators and controllers necessary to operate under controlled conditions.

The size of the heat exchanger reactor is arbitrary and is based on the desired volume of product. A convenient size is 10-15 feet in length and 4-6 feet in diameter. The number of tubes in the reactor and the diameter of the tubes depend on the catalyst type, size and shape and on the desired output. A convenient number of tubes, for the above reactor size, is 150-200 tubes per pass, with an internal diameter of ½ to 1 inch. In a two pass exchanger, the tubes extend the full length of the reactor vertically and are connected by end caps at the top and bottom of the reactor. The olefin reaction mixture is directed into one side of the bottom end cap and is returned through the other side of the bottom end cap. The interior of the top end cap is open with a outlet for the reaction effluent.

In a preferred embodiment, the reactor pressure may preferably be at least 150 psig or least at a sufficient level to ensure that a liquid phase is maintained in the reactor. The pressure may be controlled by means of a back pressure regulator on the reactor effluent line.

The reactor may desirably be operated at temperatures and conditions to produce polymer products in the molecular weight range, in the case of polyisobutylene, of about 300 to about 5,000 Daltons. Other temperatures and conditions may be used as required for specific organic conversion reactions.

The volumetric recirculation flow rate may be adjusted to provide a heat transfer coefficient of about 40-60 BTU/min-$ft^2$-° F. The volumetric feedstock flow rate may be maintained at rate to give a Liquid Hour Space Velocity (LHSV) of 1-30 kg isobutylene/kg catalyst. More preferably, the LHSV may be controlled at from about 3-10 kg isobutylene/kg catalyst.

A preferred olefin feedstock is $C_4$ raffinate, also known as raffinate-1 or raff-1. The actual composition of such a stream is variable depending on the source, but a typical raff-1 stream might contain about 0.5 wt % $C_3$, about 4.5 wt % isobutane, about 16.5 wt % n-butane, about 38.5 wt % 1-butene, about 28.3 wt % isobutylene, about 10.2 wt % cis- and trans-2-butene and less than 0.5 wt % butadiene and less than 1.0 wt % oxygenates. The presence of oxygenates may or may not affect the catalytic reaction. The $C_3$s and the n-butane are inert and pass through the reactor unchanged and are removed from the reaction mixture in the downstream stripping steps. The isobutylene reacts to a high degree depending on the reaction conditions and the desired final product. The 1- and 2-butenes may react to varying degrees depending on the catalyst type and reactor conditions. The unreacted olefins are also removed from the polymer product in the downstream stripping steps. Raff-1 feed stocks are particularly preferred for production of polymers in which high reactivity is not important. These products are referred to as conventional PIB or PB.

Another preferred olefin feedstock is the effluent from the dehydrogenation of isobutane to isobutylene, referred to simply as dehydro effluent, or DHE. DHE typically contains about 42-45 wt % isobutene, and about 50-52 wt % isobutane with the balance being small amounts of $C_3$, normal butanes and butylenes, and butadiene. This feedstock is particularly suitable for production of polyisobutylene in locations in which the inert isobutane may be utilized, for example in cooperation with an isobutane dehydrogenation unit.

Another preferred olefin feedstock is DHE in which most of the inert isobutane has already been removed. This stream is known as Isobutylene Concentrate and typically contains about 88-90 wt % isobutene, and about 5-10 wt % isobutane, with the balance being minor amounts of $C_3$, normal butanes and butylenes, and butadiene. This feedstock is also suitable for production of highly reactive polyisobutylene.

Yet another preferred olefin feedstock is high purity isobutylene which contains greater than 99 wt % isobutylene. This feedstock is highly suitable for the production of highly reactive polyisobutylene. Unreacted olefin may be easily recycled.

After leaving the reactor, the reaction effluent may be purified simply by atmospheric and/or vacuum stripping to remove light byproducts and inerts. The unreacted monomers maybe be recycled, but provisions must be made to separate or purge the inerts depending on the olefin feed type.

Because the reaction scheme discussed above allows for a very efficient removal of the heat of reaction such that isothermal and CSTR (Continuous Stirred Tank Reactor) conditions may be maintained, the volumetric efficiency is very high. That is, a large volume of product may be produced for a given reactor volume. Therefore the capital cost per volume of product is very low. The fact that downstream catalyst removal and/or catalyst regeneration equipment is not required further impacts the total capital cost in a positive manner.

Table I below shows a comparison between prior and current commercial processes for making polyisobutylene and the process of the invention of the present application employing the novel $BF_3$/alcohol-metal oxide catalyst system of the invention. In the Table 1, the column labeled "Soltex" refers to the invention of the present application. In addition, the term IB refers to isobutylene.

TABLE 1

COMPARISON OF PIB PROCESS TERMINOLOGY

| Component | Conventional | BASP/Oronite | TPC | Soltex |
|---|---|---|---|---|
| Reactor | Large, high volume, fluidized bed, 2,000-4,000 gal | Large, high volume CSTR, bed, 2,000-4,000 gal | Low volume tubular loop reactor, 30-50 gal | Low volume fixed, bed loop reactor, 50-100 gal |
| LHSV (bed wt per hr) | 1-2 | 1-2 | 5-10 | 5-10 |
| Catalyst | Solid AlCl3 slurry | BF3 gas mixed in-situ with modifier, Premixed catalyst not stable | Premixed BF3-methanol co-fed with feed. Control issues. Catalyst is stable, no BF3 gas | Solid catalyst packed in tubes of reactor. No need to co-feed with IB. Simplifies operating scheme |
| Feed | Raff-1 | High purity IB diluted with hexane | IB concentrate, 80-90% | High purity IB, no dilution |
| Cat Removal | Filtration/water wash. Neutralization of Al salts | Quench w/base followed by series of water washes | Quench w/NH4OH, followed by two mixer/settler water washes. Requires Neutralization of NH4OH | None |
| Waste | Al salts | BF3 aqueous salts | BF3 aqueous salts | None |
| High Reactive | No | Yes | Yes | Yes |
| C4 removal | C4 flasher at 50-90 psig | C4 flasher at 50-90 psig | C4 flasher at 50-90 psig | C4 flasher at 50-90 psig |
| Light Polymer Removal | Atm stripper, vacuum distillation | Atm stripper, vacuum distillation | Atm stripper, vacuum distillation | Atm stripper, vacuum distillation |

The above description of an isobutylene polymerization process has been used to illustrate the utility of the activated metal oxide catalyst system of the invention of the present application. Such description of a preferred embodiment was not meant to limit the scope of the invention. The $BF_3$/alcohol-metal oxide reaction product of the invention may be used as a catalyst in connection with any organic product reaction that requires an acid catalyst. These reactions include, but are not limited to, Friedel-Crafts alkylation, phenolic alkylation, isoparaffin alkylation, olefin dimerization and polymerization in general, higher alpha olefin dimerization and isobutylene dimerization among others.

The foregoing disclosure and description of the invention is illustrative and explanatory thereof. Various changes in the details of the described method can be made within the scope of the present invention without departing from the true spirit of the present invention. The present invention should only be limited by the following claims and their legal equivalents.

I claim:

1. A method for preparing a catalyst system for heterogenous catalysis of an isobutylene polymerization reaction, the method comprising:
   forming an alumina support in which said alumina support has pores formed therein, each of the pores has a diameter of greater than 20 nanometers; and
   reacting a $BF_3$/methanol catalyst complex with said alumina support, wherein a ratio of methanol to $BF_3$ in said catalyst complex ranges from 0.5 moles of methanol per mole of $BF_3$ to 2 moles of methanol per mole of $BF_3$, wherein a concentration of said catalyst complex on said alumina support ranges between 10% and 40% by weight.

2. The method of claim 1, the step of forming comprising: forming said alumina support into a bead form.

3. A method for preparing a catalyst system for heterogenous catalysis of an isobutylene polymerization reaction, the method comprising:
   forming an alumina support in which said alumina support has pores formed therein; and
   reacting a $BF_3$/methanol catalyst complex with said alumina support, wherein a ratio of methanol to $BF_3$ in said catalyst complex ranges from 0.5 moles of methanol per mole of $BF_3$ to 2 moles of methanol per mole of $BF_3$, wherein a concentration of said catalyst complex on said alumina support ranges between 10% and 40% by weight, the step of forming comprising:
      extruding said alumina support so as to have a significantly greater length dimension than a diameter dimension.

4. The method of claim 3, the extruded alumina support having the pores each having a diameter greater than 20 nanometers.

5. The method of claim 4, the extruded alumina support having a tri-lobe configuration in a cross section transverse to the length dimension.

6. The method of claim 3, the extruded alumina support being of a cylindrical shape.

7. The method of claim 1, said alumina support being formed of amorphous alumina.

8. A method for preparing a catalyst system for heterogenous catalysis of an isobutylene polymerization reaction, the method comprising:
  forming an alumina support in which said alumina support has pores formed therein; and
  reacting a $BF_3$/methanol catalyst complex with said alumina support, wherein a ratio of methanol to $BF_3$ in said catalyst complex ranges from 0.5 moles of methanol per mole of $BF_3$ to 2 moles of methanol per mole of $BF_3$, wherein a concentration of said catalyst complex on said alumina support ranges between 10% and 40% by weight, said alumina support being in a fixed bed, the step of reacting occurring in said fixed bed.

9. The method of claim 1, the step of reacting comprising a reaction selected from the group consisting of Friedel-Crafts alkylantion, phenol alkylation, olefin dimerization, olefin oligomerization, olefin polymerization, propylene oligomerization, propylene polymerization, butylene dimerization, butylene oligomerization, isobutylene dimerization, isobutylene oligomerization, butylene polymerization, isobutylene polymerization and isoparaffin alkylation.

10. The method of claim 1, the concentration of said catalyst complex on said alumina support ranges between 30% to 40% by weight.

11. A method for preparing a catalyst system for heterogenous catalysis of an isobutylene polymerization reaction, the method comprising:
  forming an alumina support in which said alumina support has pores formed therein;
  reacting a $BF_3$/methanol catalyst complex with said alumina support, wherein a ratio of methanol to $BF_3$ in said catalyst complex ranges from 0.5 moles of methanol per mole of $BF_3$ to 2 moles of methanol per mole of $BF_3$, wherein a concentration of said catalyst complex on said alumina support ranges between 10% and 40% by weight; and
  forming isobutylene as a result of the step of reacting.

12. The method of claim 11, further comprising:
  polymerizing the isobutylene so as to form a polyisobutylene product.

13. The method of claim 1, said alumina support formed substantially entirely of alumina.

14. A method for preparing a catalyst system for heterogenous catalization of an isobutylene polymerization reaction, the method comprising:
  forming an alumina support having a plurality of alumina elements therein in which each of said plurality of alumina elements has pores formed therein, the step of forming comprising extruding said alumina support so as to have a significantly greater length dimension than a diameter dimension; and
  reacting a $BF_3$/methanol catalyst complex with said alumina support, wherein a ration of methanol to $BF_3$ in said catalyst complex ranges from 0.5 moles of methanol per mole of $BF_3$ to 2 moles of methanol per mole of $BF_3$.

15. The method of claim 14, the extruded alumina support having the pores each having a diameter greater than 20 nanometers.

16. The method of claim 14, said alumina support formed of amorphous alumina.

17. A method for preparing a catalyst system for heterogenous catalization of an isobutylene polymerization reaction, the method comprising:
  forming an alumina support having a plurality of alumina elements therein in which each of said plurality of alumina elements has pores formed therein;
  reacting a $BF_3$/methanol catalyst complex with said alumina support, wherein a ration of methanol to $BF_3$ in said catalyst complex ranges from 0.5 moles of methanol per mole of $BF_3$ to 2 moles of methanol per mole of $BF_3$; and
  placing said plurality of alumina elements into a fixed bed, the step of reacting occurring in said fixed bed.

18. The method of claim 14, each of said plurality of alumina elements being formed substantially entirely of alumina.

* * * * *